US010603794B2

(12) United States Patent
Buibas et al.

(10) Patent No.: US 10,603,794 B2
(45) Date of Patent: Mar. 31, 2020

(54) ROBOTIC CAMERA SYSTEM

(71) Applicant: Accel Robotics Corporation, San Diego, CA (US)

(72) Inventors: Marius O. Buibas, San Diego, CA (US); Martin A. Cseh, San Diego, CA (US); Michael B. Maseda, Las Vegas, NV (US); Nicholas J. Morozovsky, San Diego, CA (US)

(73) Assignee: Accel Robotics Corporation, San Diego, CA (US)

( * ) Notice: Subject to any disclaimer, the term of this patent is extended or adjusted under 35 U.S.C. 154(b) by 395 days.

(21) Appl. No.: 15/797,819

(22) Filed: Oct. 30, 2017

(65) Prior Publication Data

US 2018/0043543 A1 Feb. 15, 2018

Related U.S. Application Data

(63) Continuation-in-part of application No. 15/226,760, filed on Aug. 2, 2016, now Pat. No. 9,969,080.

(60) Provisional application No. 62/418,719, filed on Nov. 7, 2016, provisional application No. 62/210,902, filed on Aug. 27, 2015.

(51) Int. Cl.
*G01C 21/00* (2006.01)
*B25J 9/16* (2006.01)
(Continued)

(52) U.S. Cl.
CPC ........... *B25J 9/1697* (2013.01); *B25J 9/0075* (2013.01); *B25J 9/1679* (2013.01); *B25J 18/02* (2013.01); *G01B 11/0608* (2013.01);
*G01B 11/14* (2013.01); *G06K 9/00228* (2013.01); *G06T 7/11* (2017.01); *G06T 7/70* (2017.01);
(Continued)

(58) Field of Classification Search
CPC ........ B25J 9/1697; B25J 18/02; B25J 9/0075; B25J 9/1679; H04N 5/2252; H04N 5/247; H04N 5/2256; H04N 5/2257; G06K 9/00228; G06T 7/70; G06T 7/11; G01B 11/14; G01B 11/0608; Y10S 901/01
See application file for complete search history.

(56) References Cited

U.S. PATENT DOCUMENTS

| 1,550,944 A | 8/1925 | Beidler et al. |
|---|---|---|
| 4,718,519 A | 1/1988 | Barker |

(Continued)

*Primary Examiner* — Ian Jen
(74) *Attorney, Agent, or Firm* — Arc IP Law, PC; Joseph J. Mayo

(57) ABSTRACT

A robotics camera system includes a camera robot that is in wireless communication with a robot cloud server through a cloud network such as the Internet. A user having a mobile device desires to utilize a particular camera robot. The user mobile device may wirelessly communicate with the camera robot either directly or indirectly, through the cloud network. User interaction with the camera robot may be to initiate a photo session and/or to have the camera robot follow the user through a venue. In some embodiments the user initiates the interaction through a social media platform. In some embodiments the user initiates the interaction by utilizing a designated application that runs upon the user's mobile device. In some embodiments the user initiates the interaction with the use of a two-dimensional machine-readable code element. In some embodiments the user initiates an interaction with a plurality of robots that work collaboratively.

20 Claims, 16 Drawing Sheets

(51) Int. Cl.
*B25J 9/00* (2006.01)
*B25J 18/02* (2006.01)
*G01B 11/14* (2006.01)
*G06T 7/11* (2017.01)
*G06T 7/70* (2017.01)
*G06K 9/00* (2006.01)
*G01B 11/06* (2006.01)
*H04N 5/225* (2006.01)
*H04N 5/247* (2006.01)

(52) U.S. Cl.
CPC ......... *H04N 5/2252* (2013.01); *H04N 5/2256* (2013.01); *H04N 5/2257* (2013.01); *H04N 5/247* (2013.01); *Y10S 901/01* (2013.01)

(56) References Cited

U.S. PATENT DOCUMENTS

| | | |
|---|---|---|
| 4,934,647 A | 6/1990 | Edwards |
| 4,964,607 A | 10/1990 | Lindsay |
| 7,756,322 B2 | 7/2010 | Saitou et al. |
| 2007/0013506 A1* | 1/2007 | Takenaka ............... B25J 13/085 340/500 |
| 2008/0147238 A1* | 6/2008 | Joly .................... G05B 19/237 700/260 |
| 2010/0277584 A1 | 11/2010 | Price |
| 2016/0139577 A1* | 5/2016 | Seehof .................. B25J 9/0009 700/275 |
| 2016/0336878 A1* | 11/2016 | Torres ..................... H02N 2/02 |
| 2017/0108848 A1* | 4/2017 | Moberg ............... G05B 19/404 |

* cited by examiner

ROBOTIC CAMERA SYSTEM

RELATED APPLICATIONS

This non-provisional patent application claims priority to U.S. Provisional Application Ser. No. 62/418,719, Entitled "Robotic Camera System" by Marius O. Buibas et al., filed on Nov. 7, 2016, incorporated herein by reference under the benefit of U.S.C. 119(e). This non-provisional patent application is also a continuation-in-part of U.S. application Ser. No. 15/226,760, entitled "Robotic Camera System" by Marius O. Buibas et al., filed on Aug. 2, 2016 which claims priority to provisional Application No. 62/210,902, Entitled "Robotic Camera System" by Marius O. Buibas et al., filed on Aug. 27, 2015, incorporated herein by reference under the benefit of U.S.C. 119(e).

FIELD OF THE INVENTION

The present disclosure concerns a robotic camera system enabling a user to obtain very high quality still and video images. In particular, the robotic camera system provides a convenient way to capture images of the user with or without companions.

BACKGROUND

Users typically capture still frame images and videos when visiting venues such as landmarks, theme parks, zoos, and stadiums or at special events such as birthday parties or other celebrations. Typically the user brings an owned camera to capture images. This can be inconvenient when the user wants self-portraits and wants to include all companions in an image frame. SLR (single lens reflex) cameras with good lenses can be bulky and smartphone cameras are compromised on quality. There is a desire to capture high quality images with more convenience at such venues. There is also a desire to reduce the burden of high quality picture and video capture for a user.

SUMMARY

Figure 1A:
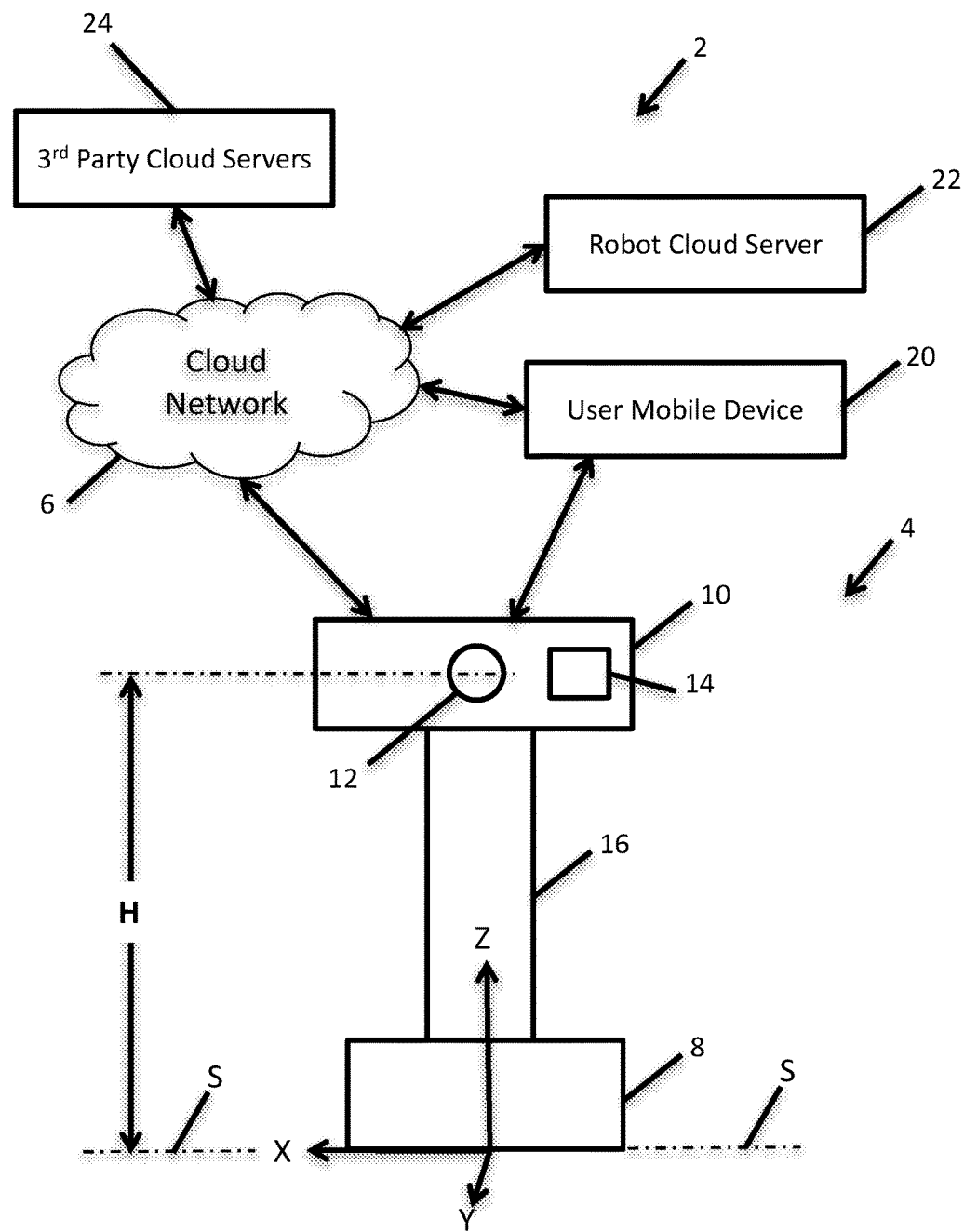
FIG. 1A is a first schematic representation of a robotics camera system with emphasis on the structure of a camera robot.

This disclosure concerns the construction, electronics, control, and use of a robotic camera system including a camera robot for capturing images of subjects in various venues. Reference to "subjects" includes humans as well as animals such as pets, wildlife, and zoo animals. The venues can include commercial establishments such as theme parks, zoos, arenas, convention centers, retail stores, arcades, and restaurants to name a few examples. The venues can also include personal homes and landmarks and are only limited by the configuration and capabilities of the robotic camera system.

The robotic camera system includes a camera robot that is in wireless communication with a robot cloud server through a cloud network such as the Internet. A user having a mobile device desires to utilize a particular camera robot. The user mobile device may wirelessly communicate with the camera robot either directly or indirectly, through the cloud network. User interaction with the camera robot may be to initiate a photo session and sometimes to have the camera robot follow the user through a venue. In some embodiments the user initiates the interaction through a social media website. In some embodiments the user initiates the interaction by utilizing a designated application that runs upon the user's mobile device. In some embodiments the user initiates the interaction with the use of a two-dimensional machine-readable code element that is provided to the user from the robot cloud server.

The robotic camera system includes a processor coupled to a non-transient storage medium. More particularly, each of the camera robot, the robot cloud server, and the user mobile device include a processor coupled to a non-transient storage medium. For each of these, the non-transient storage medium stores instructions. When these instructions are executed by the processor, certain methods are performed. The following disclosure describes a number of methods that can be performed by one or more of these processors operating separately and/or in combination. Also, the robotic camera system includes one or more databases for storing and relating information such as camera robot communication addresses, camera robot identification information (such as images of each camera robot and associated metadata), two-dimensional image elements (e.g., a two-dimensional barcode, an icon, or other features), passwords, and other related information elements.

In one aspect of the disclosure, a camera robot for capturing image frames in response to a request includes: (1) a base having a transport mechanism that controllably imparts motion along a support surface, (2) a robot head, (3) a camera mounted to the robot head and having a camera axis CA, (4) a vertical positioning mechanism that couples the robot head to the base and controllably adjusts a distance between the robot head and the base, and (5) a control system including a processor and a non-transient medium storing computer readable instructions for receiving the request and performing a photo session in response. A Z-axis is centrally defined along the vertical positioning mechanism between the base and the robot head and is coincident with or defines an acute angle with a vertical direction of gravitation. A lateral Y axis is defined normal to the Z-axis and is coincident with or defines an acute angle with the camera axis CA. A lateral X axis is defined normal to the Y and Z axes.

In one implementation the base includes three "omnidirectional" wheels that are coupled to wheel motors and encoders. The axes of rotation of the three wheels are uniformly distributed in the XY plane, 120 degrees apart. Passive rollers embedded in each wheel allow free translation in the direction of the axis of rotation. The wheels can thereby rotate the camera robot about the Z-axis and translate the robot in any lateral direction across the support surface.

In another implementation the camera is a camera system including one or more of a 360 degree camera system, a three-dimensional (3D) camera system, an SLR (single-lens reflex) camera system, or a mirrorless interchangeable lens camera system. A 360 degree camera system can include more than one camera including forward facing (+Y direction) and backward (−Y direction) cameras as well as cameras facing at multiple lateral angles. More cameras facing different directions minimizes a degree that the base needs to rotate about Z to provide full 360 degree coverage. A 3D camera system has more than one camera facing in a particular direction having a lateral separation that is normal to the direction that they are facing. For example, two cameras facing forward (+Y) that are separated in X will provide an added dimension. An SLR or mirrorless camera system can include camera motion within the robot head including an ability to tilt about the X axis. The SLR or mirrorless camera system may also include camera rotations about the Y and/or Z axis. The camera system is advantageously used both to perceive the environment and users as well as to capture image frames. This is a preferred embodiment as opposed to having two separate camera systems (which increases cost and complexity) to handle these tasks separately.

In a further implementation the vertical positioning mechanism includes a scissor mechanism. The scissor mechanism has a link drive mechanism that is mounted proximate to the base of the camera robot. Extending upwardly (+Z) from the link drive mechanism is an assemblage of scissor links that are actuated by the link drive mechanism. In a lowered configuration the scissor links are nearly horizontal. As the link drive mechanism rotates the scissor links away from the nearly horizontal orientation to a more vertical orientation, the scissor mechanism dimension along axis Z increases thereby raising the robot head relative to the base. This increases a value of h which is a distance between the robot head and the base and a value of H which is a distance of the camera axis CA above the support surface. The scissor mechanism includes a plurality of scissor stages which include pairs of crossed scissor links. The lower side of a first scissor stage is coupled to the link drive mechanism. The upper side of the first scissor state is coupled to the lower side of the second scissor stage. Thus the scissor stages are linked. The upper scissor stage is coupled to the robot head. In an exemplary embodiment the scissor mechanism includes five scissor stages. In a preferred embodiment each scissor stage includes three pairs of scissor links such that the scissor mechanism defines a triangular prism shape. The use of a scissor mechanism enables the camera robot to vary in height from a very compact storage configuration to a very tall configuration whereby the camera axis can have height that is close to that of a subject's eyes. The triangular prism (three pairs of scissor links per stage) provides a mechanically stable configuration with minimized complexity. The scissor mechanism can be covered with a stretchable fabric to ensure smooth operation and safety of users by preventing users from putting objects or hands in the mechanism.

In yet another implementation the non-transient medium stores instructions that when executed by the processor perform a method including: (1) learning an image element physically carried with a user of the camera robot, (2) storing a desired distance range, (3) searching an image frame captured by the camera for the image element, (4) if the image element is found, then measuring and estimating a distance between the camera and the image element, and (5) activating the transport mechanism to move the robot laterally along the support surface until the camera is positioned within the desired distance range from the image element. The image element can be one or more of: an image of an article of clothing of the user, an image of the user's face, a geometric attribute of the user, an icon carried by the user, or a machine-readable code carried by the user. Examples of machine-readable codes include two-dimensional barcodes and QR codes.

In a yet further implementation the non-transient medium stores instructions that when executed by the processor perform a method including: (1) learning an image element physically carried with a user of the camera robot, (2) storing a desired distance range, (3) searching an image frame captured by the camera for the image element, (4) if the image element is not found, then transmitting a message from the camera robot to a mobile device held by the user. The message may include instructions for the user to walk within view of the camera robot's camera.

In another implementation the non-transient medium stores instructions that when executed by the processor perform a method including: (1) learning an image element physically carried with a user of the camera robot, (2) storing a desired distance range, (3) searching an image frame captured by the camera for the image element, (4) if the image element is found then determining an orientation of the image element. If the orientation is within a certain predetermined range, then the method includes activating a photo session. The photo session can include one or more of: activating the transport mechanism, camera zoom, and/or camera orientation to properly frame a subject, activating the vertical positioning mechanism to move the camera axis CA closer to being in at the same vertical height as a subject's eyes, providing audible and/or visual instructions to the subject, and capturing one or more image frames and possibly audio. The subject can be the user, a subject associated with the user, or a group of subjects.

In yet another implementation, the camera robot may continue to maintain a set distance to the image element during the photo session, for example, to record image frames (video) of a user walking through a venue.

In a further implementation, the non-transient medium stores instructions that when executed by the processor perform the method including: (1) starting a photo session with a user of the camera robot, (2) capturing an image of the user, (3) storing a desired distance range, (4) searching one or more image frames for the user based upon the stored image, and (5) if the user is not found, then transmitting a message from the camera robot to a mobile device held by the user. The method also includes: when the user is found, then estimating a distance between the camera robot and the user and activating the transport mechanism until the camera robot is positioned at the desired distance range from the user. The image of the user may include the user's face and facial recognition may be utilized to identify the user within an image frame. The method can include providing a link to allow the user to pay for the use of the camera robot.

In another aspect of the invention a robotic camera system includes a robot cloud server that is coupled to a plurality of camera robots at various physical locations through a cloud network such as the Internet. Also coupled to the Internet are third-party servers that serve up social media websites and application interfaces. Also coupled to the Internet is a mobile device carried by a user desiring to use a particular camera robot. Each of the robots have identifying marks or features that either separately or together with location and time metadata, uniquely identify the robots. The cloud server has a database that stores directory information that uniquely identifies each robot and a communication address which may include an Internet Protocol address (IP address) for separately communicating with each robot. Thus the database correlates the identifying marks or features of each robot with that robot's communication address. The robot cloud server and the camera robot each have a processor coupled to a non-transient storage medium. The non-transient storage media store instructions that when executed by one of the processors perform a method. The method may be performed by the robot could server, the camera robot, or both in combination.

In one implementation the method includes the following steps: (1) receiving an image of the camera robot that has been captured by the user's mobile device, (2) receiving metadata originating from the user's mobile device including location data for the captured image of the camera robot, (3) processing the image of the camera robot and the metadata to identify a particular one of the plurality of camera robots, and (4) sending an authorization signal to the particular camera robot to initiate a photo session or enable the user to utilize the camera robot.

In another implementation the user captures an image of a particular camera robot using the user's mobile device. The captured image includes metadata including location and timestamp information. The user then posts the image to a social media website hosted by one of the third-party servers along with a designated hashtag. The designated hashtag is one that is stored (known) by the robot cloud server. The robotic camera system then executes the following method: (1) The robot cloud server scrapes the social media website and detects the captured image associated with the designated hashtag. (2) The robot cloud server analyzes the image to uniquely identify the particular camera robot. (3) The robot cloud server then sends a message and/or authorization information to the particular camera robot to activate a photo session or to enable the user to utilize the robot. (4) The camera robot performs a photo session for the user. (5) The camera robot transfers image frames captured during the photo session to the robot cloud server. (6) The robot cloud server transfers the image frames to the third-party server hosting the social media website and application interface. The user can then access the image frames from the social media website or application interface. In one embodiment the robot cloud server also sends a unique two-dimensional code to the user that allows the user to take control of the robot. The unique two-dimensional code can be an icon, a two-dimensional barcode, or a QR code to name some examples.

In yet another implementation the user's mobile device includes a "designated application" that serves as an application interface to the robot cloud server. The designated application thereby serves as a part of the robotic camera system. The user captures an image of a particular camera robot using the user's mobile device. The captured image includes metadata including location and timestamp information. Then the robotic camera system performs the following method: (1) The designated application receives the image and the metadata. (2) The designated application transfers the image and metadata to the robot cloud server. (3) The robot cloud server analyzes the image to uniquely identify the particular camera robot. (4) The robot cloud server then sends a message and/or authorization information to the particular camera robot to activate a photo session or to enable the user to utilize the robot. (5) The camera robot performs a photo session for the user. (6) The camera robot transfers image frames captured during the photo session to the robot cloud server. (7) The robot cloud server then transfers the image frames to the designated application on the user's mobile device. (8) The designated application makes the image frames available to the user. In one embodiment the robot cloud server also sends a unique two-dimensional code to the user that allows the user to take control of the robot. The unique two-dimensional code can be an icon, a two-dimensional barcode, or a QR code to name some examples.

In a further implementation the robot camera system includes multiple robots at different positions framing the same subjects, working together to capture photos and videos from different angles. One example might be 2-3 camera robots collaborating to synchronously capture a scene, where 1-2 robots might capture close-up shots and a 3rd might capture a wider shot of the scene. The photos can be made into a photo montage, or video can be edited like a television show. In another embodiment, synchronized video and position information from each of the robots can be processed to extract 3D shape, and subjects can be digitally placed in another scene, by matching positions from the real world. The basic workflow from one robot can translate to multiple robots looking at the same targets. 3D reconstruction is possible from position and velocity of robot and camera orientation information synchronized with video.

DETAILED DESCRIPTION OF THE PREFERRED EMBODIMENTS

This description concerns a robot-based or robotic camera system which includes a camera robot. In use the camera robot is typically placed upon a support surface which can be a floor or walkway. In the disclosure various geometric terms such as vertical, lateral, normal, and horizontal are used. Vertical generally means aligned with a gravitational reference. Horizontal is perpendicular to vertical. Lateral generally refers to a direction along the support surface and the normal direction is perpendicular to the support surface (or at least the portion of the support surface upon which the robot rests). Mutually orthogonal geometric axes X, Y, and Z are also used. These axes refer to directions that are internal to a camera robot. In some cases the Z axis may be aligned with the vertical (gravitational) axis. But if the robot is placed upon a sloping support surface then Z may not be exactly vertical. The axes X and Y can be horizontal, lateral or some other direction that is normal to Z. Typically if Z is not aligned with the vertical, it defines an acute angle with vertical.

Figure 1B:
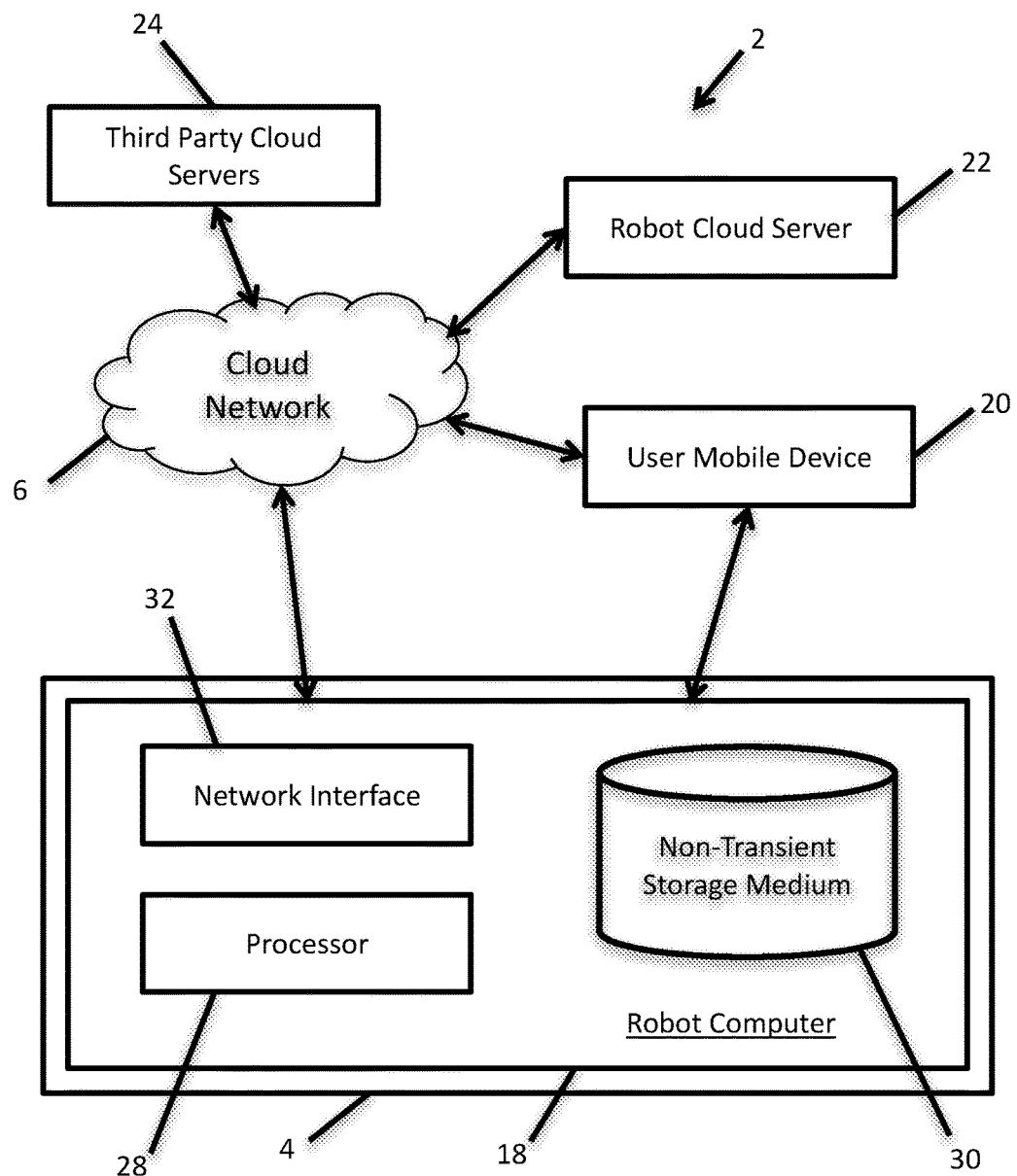
FIG. 1B is a second schematic representation of a robotics camera system with emphasis on a robot computer interfacing with servers and a user mobile device.

FIGS. 1A and 1B depict an exemplary robotic camera system 2. Robotic camera system 2 has both consumer and commercial uses. Robotic camera system 2 may be used in various venues including consumer homes, theme parks, zoos, historical sites, landmark viewing areas, factories, and retail sales location to name a few examples.

Robotic camera system 2 includes a camera robot 4 that is in wireless communication with various devices either directly or through a cloud network 6. Camera robot 4 includes a base 8 that is in contact with a support surface S. The base 8 provides a function of providing stability and lateral transport for camera robot 4. In an exemplary embodiment the transport is provided by omni-directional wheels (shown in later drawings).

Camera robot 4 includes a robot head 10 that includes a camera 12 and may include user interface features 14. The camera 12 is one or more cameras that includes one or more of an SLR or mirrorless camera, a 360 degree camera system, or a 3D (three-dimensional) camera system. The user interface features are shown as mounted to the robot head 10 but it is to be understood that they may be mounted to other portions of camera robot 4.

Camera robot 4 includes a vertical positioning mechanism 16 that couples the robot head 10 to the base 8. Vertical positioning mechanism 16 is mechanized to enable automated or semi-automated control of the vertical position H of camera 18 relative to the support surface S. The vertical positioning mechanism 16 can take on a number of forms such as telescoping cylinders, rack and pinion systems, and lead screw-driven systems to name a few examples. In an exemplary embodiment vertical positioning mechanism includes a scissor link based mechanism.

FIG. 1A depicts mutually perpendicular axes X, Y, and Z. Generally speaking, the axis Z is a central axis of camera robot 4 and would define roughly the central axis of vertical positioning mechanism 16. If axis Z is aligned with a vertical gravitational reference then axes X and Y would be horizontal. Axis X is perpendicular to a camera axis CA of camera 12. Axis Y can be parallel to the camera axis CA unless camera 12 is tilted about axis X. If the camera is tilted about axis X then the camera axis CA will extend along axes Y and Z. Axis Z is central to the vertical positioning mechanism 16 and can coincide with a gravitational reference. If base 14 is positioned upon a sloping and/or curved support surface S, then axes X and Y may not be horizontal and axis Z may not be vertical.

FIG. 1B is a block diagram representation of robotic camera system 2 from the standpoint of data processing and data storage. Camera robot 4 includes a robot computer 18 that is coupled to a user mobile device 20, a robot cloud server 22, and third-party cloud servers 24 through cloud network 6 (i.e., the Internet). The robot computer 18 may also communicate directly with user mobile device 20. The connections of the robot computer with cloud network 6 and user mobile device 20 are wireless and may utilize a standard protocol such as IEEE 802.11X or Bluetooth, to name two examples.

The user mobile device 20 can be a laptop computer, a smartphone, a PDA (personal digital assistant), a tablet computer, or any other mobile computer carried by a user. The user mobile device 20 may run a "designated application" that specifically facilitates interaction with the robot computer 18 and the robot cloud server 22. The robot cloud server 22 is a server that is dedicated to a system of camera robots 4 for facilitating interactions between user mobile devices 20 and camera robots 4. The third-party servers 24 are servers that serve web pages including social media websites and application interfaces. Such web pages are accessible with user mobile device 20.

The robot computer has processor or controller 28 that is coupled to a non-transient storage medium 30 and a network interface 32. The non-transient storage medium 30 stores computer-readable instructions that, when executed by processor 28, perform various methods. The various methods performed can include methods as those to be discussed with respect to FIGS. 5, 6A, 6B, 7, 8, and 9. Non-transient storage medium 30 can include one or more of a hard drive, a optical drive, a flash memory drive, or other non-volatile storage devices. The network interface 32 includes hardware that facilitates communication between processor 28 and devices on the cloud network 6 and with user mobile device 20.

Figure 2A:
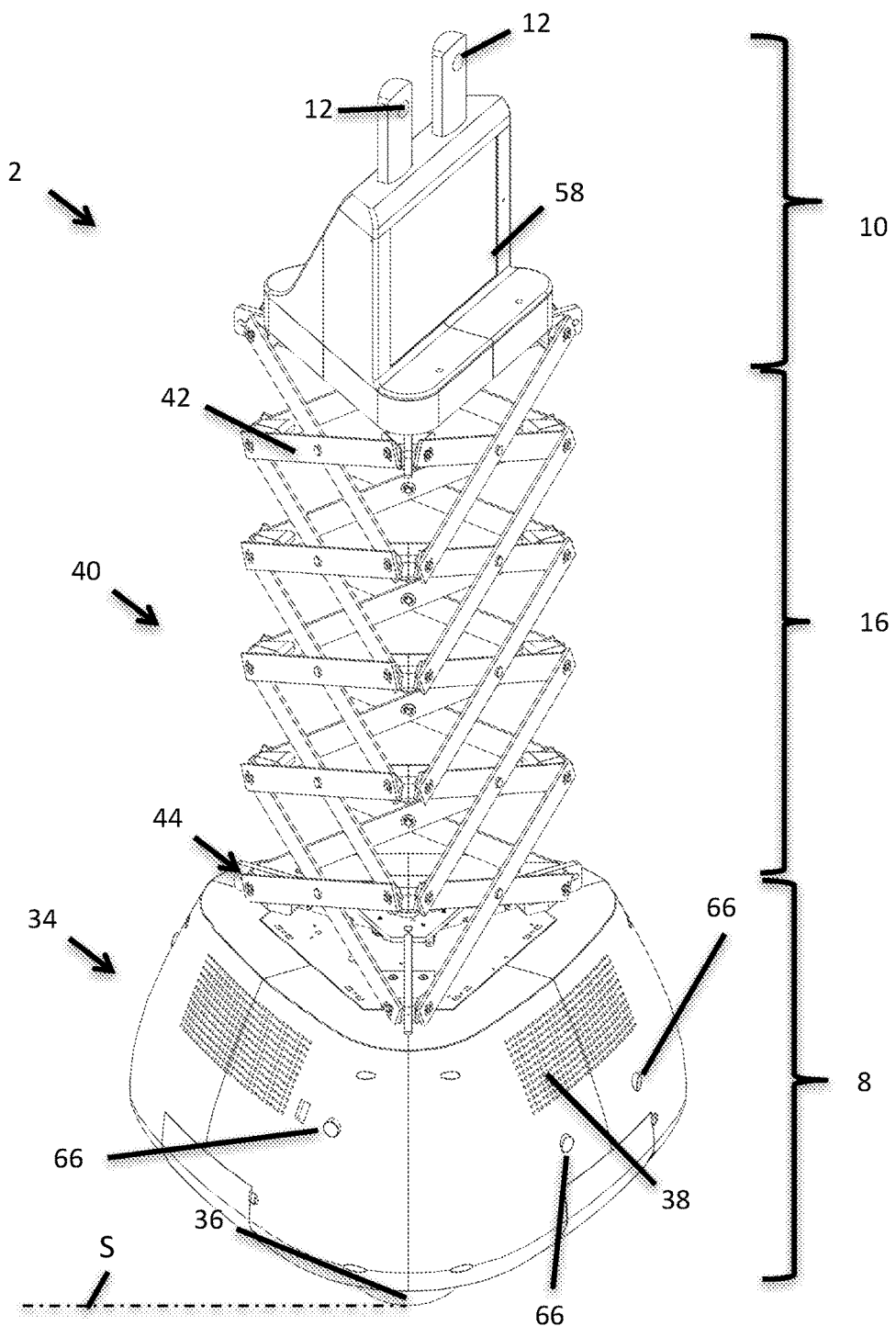
FIG. 2A is an isometric representation of a first exemplary embodiment of a camera robot for capturing image frames.
Figure 2B:
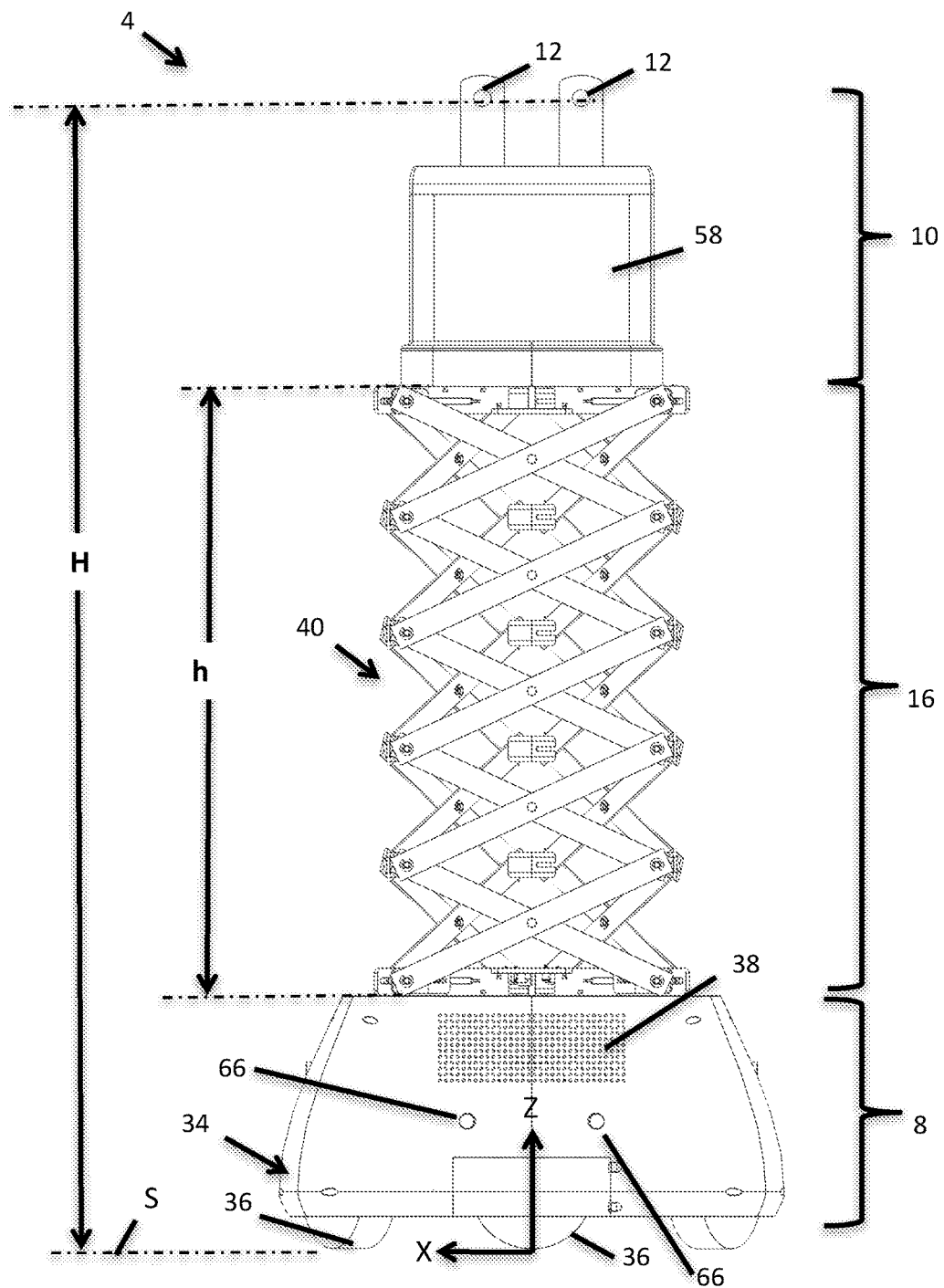
FIG. 2B is a front view of a first exemplary embodiment of a camera robot for capturing image frames.
Figure 2C:
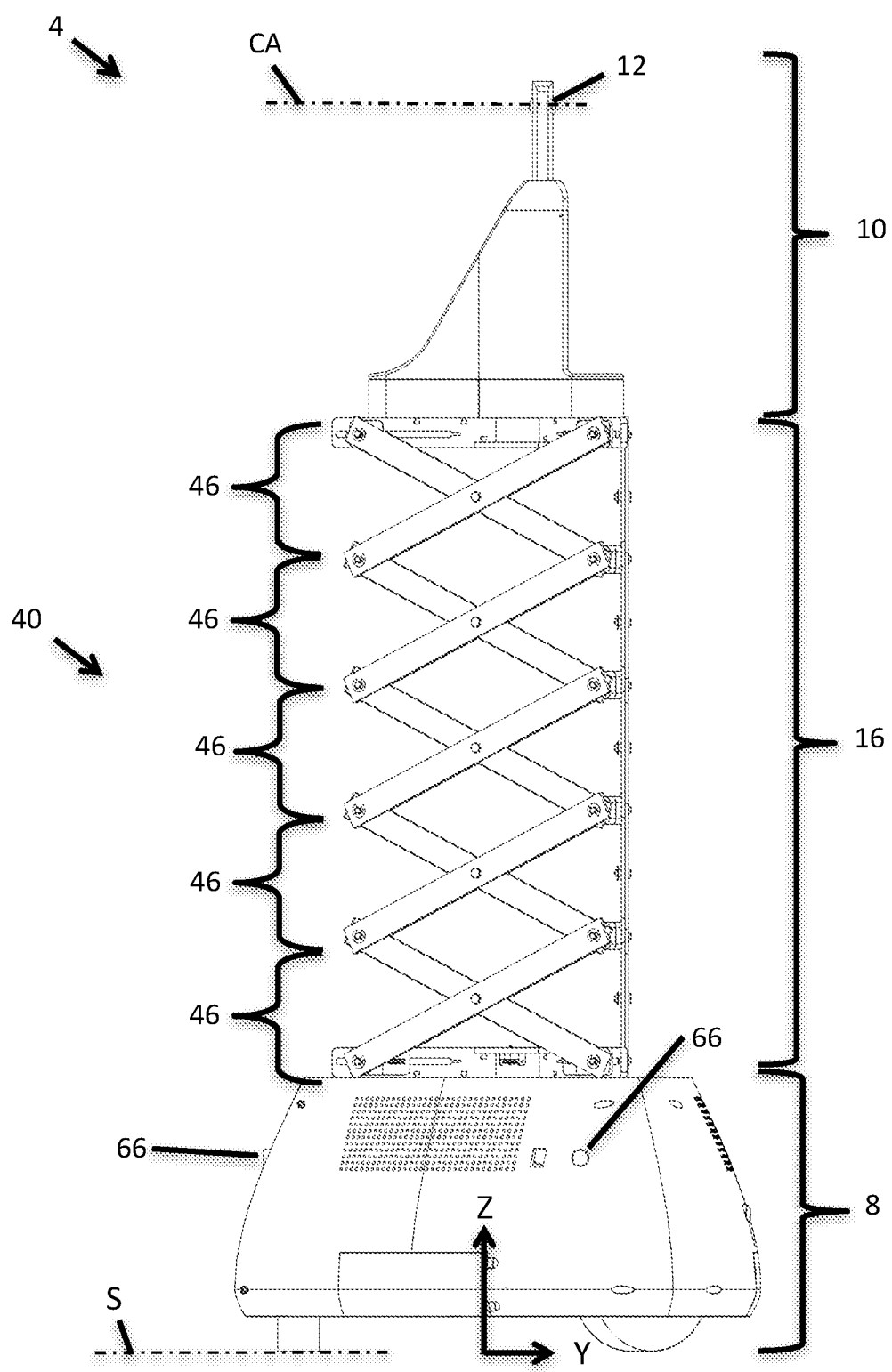
FIG. 2C is a side view of a first exemplary embodiment of a camera robot for capturing image frames.

FIGS. 2A-2C are different views of an exemplary embodiment of camera robot 4. FIG. 2A is an isometric view. Base 8 includes a transport mechanism 34 including omni-directional wheels 36. Omni-directional wheels 36 can be controllably rotated to impart motion of base 8 across support surface S generally along axes X and Y. Wheels 36 an also enable rotation of robot 4 about central axis Z. Base 8 also includes speakers 38 for communicating with a user and/or a photographic subject.

Vertical positioning mechanism 16 includes a scissor mechanism 40. In the illustrated embodiment scissor mechanism 40 is a triangular scissor mechanism that advantageously exhibits superior strength with the least complexity for the disclosed application. Scissor mechanism includes a plurality of interconnected scissor links 42 that are coupled to a link drive mechanism 44. The link drive mechanism 44 controllably causes pairs of scissor links 42 to rotate relative to one another. As each scissor link rotates to become more nearly vertical, the distance H increases (see FIG. 2B). As each scissor link rotates to become more horizontal, the height H decreases.

Robot head 10 supports cameras 12. In the illustrated embodiment there are two cameras 12 that are separated along the axis X to provide 3D images. Also, cameras 12 can provide a 360 degree panoramic image.

FIG. 2B is a front view of camera robot 4. The distance H is more clearly illustrated as the vertical distance between support surface S and a camera axis for each camera 12. Also illustrated is a distance h which between robot head 10 and base 8 which is defined by the scissor mechanism 40. In a first exemplary embodiment the scissor mechanism 40 can vary the distance h between the base 8 and the robot head 10 by a factor of at least two. In a second exemplary embodiment the scissor mechanism 40 can vary the distance h between the base 8 and the robot head 10 by a factor of at least three. In a third exemplary embodiment the scissor mechanism 40 can vary the distance h between the base 8 and the robot head 10 by a factor of at least four. In a fourth exemplary embodiment the scissor mechanism 40 can vary the distance h by a factor of at least five. In a fifth exemplary embodiment the scissor mechanism 40 can vary the distance h by a factor of at least seven. In a sixth exemplary embodiment the scissor mechanism 40 can vary the distance h by a factor of at least ten.

FIG. 2C is a side view of camera robot 4. As can be seen, scissor mechanism 40 has five scissor stages 46. In FIG. 2C, each scissor stage appears in this view to be defined by a pair of scissor links 42. However, each scissor stage 46 is defined by six scissor links 42 since scissor mechanism 40 defines a triangular prism as is apparent from FIGS. 2A and 2B. FIG. 2C also illustrates cameras 12 as facing in both +Y (front-facing) and −Y (rear-facing) directions to enable the 360 panoramic image capture.

Figure 3A:
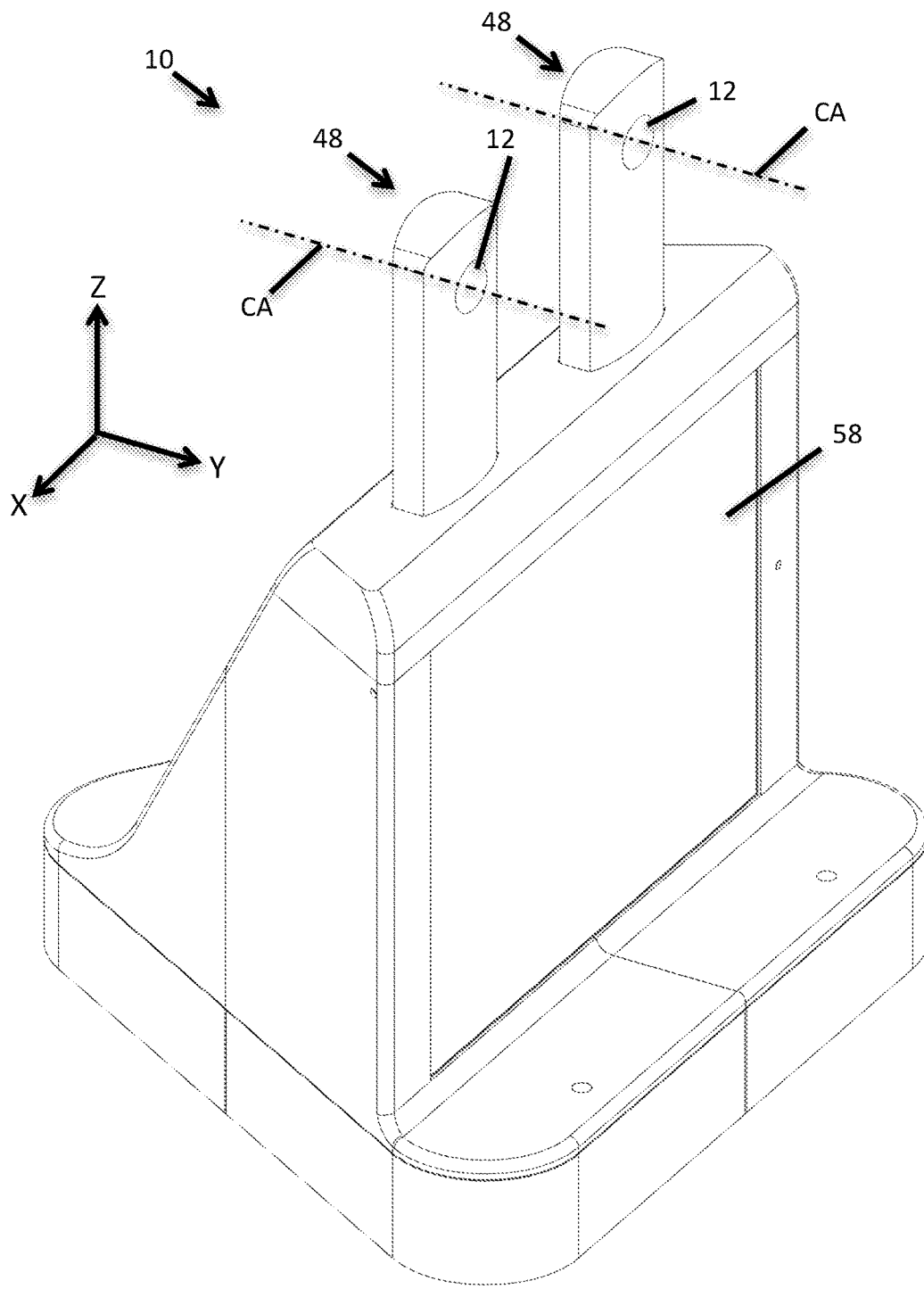
FIG. 3A is an isometric view of a first embodiment of a robot head that supports a camera system.

FIGS. 3A-3D illustrate four exemplary embodiments of robot head 10. FIG. 3A is an isometric drawing depicting a first embodiment of robot head 10 from FIGS. 2A-C. Depicted robot head 10 has four cameras 12 including two camera pairs 48. Each camera pair 48 includes a forward (+Y) and a backward (−Y) facing camera 12 to facilitate a 360 degree image capture. Also, the camera pairs 48 are separated from each other along axis X to enable three-dimensional (3D) stereoscopic image information to be captured.

Figure 3B:
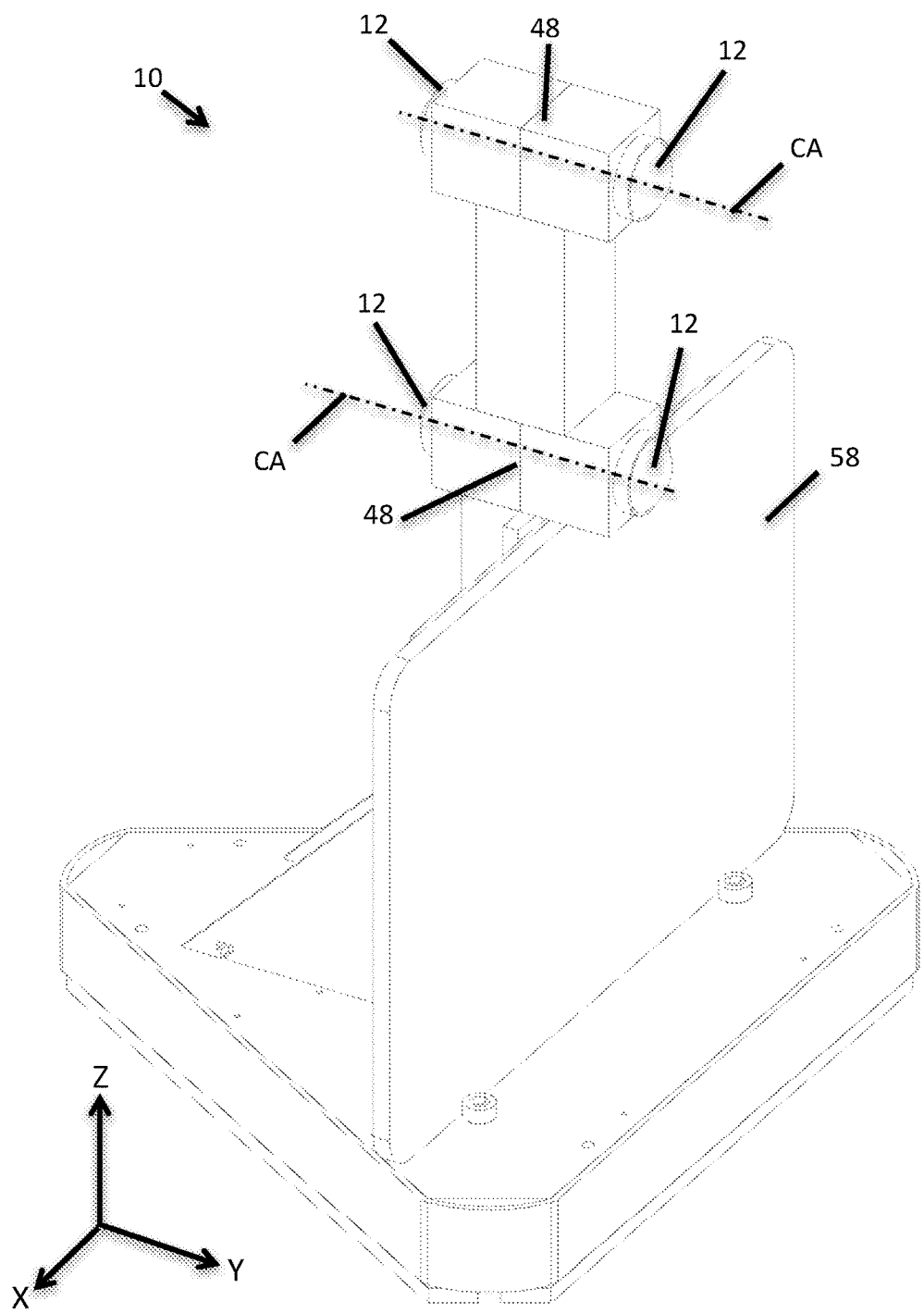
FIG. 3B is an isometric view of a second embodiment of a robot head that supports a camera system.

FIG. 3B is an isometric drawing depicting a second embodiment of robot head 10. Depicted robot head 10 has four cameras 12 including two camera pairs 48. Each camera pair 48 includes a forward (+Y) and a backward (−Y) facing camera 12 to facilitate a 360 degree image capture. The camera pairs 48 are separated from each other along Z to enable three-dimensional stereoscopic image information to be captured.

Figure 3C:
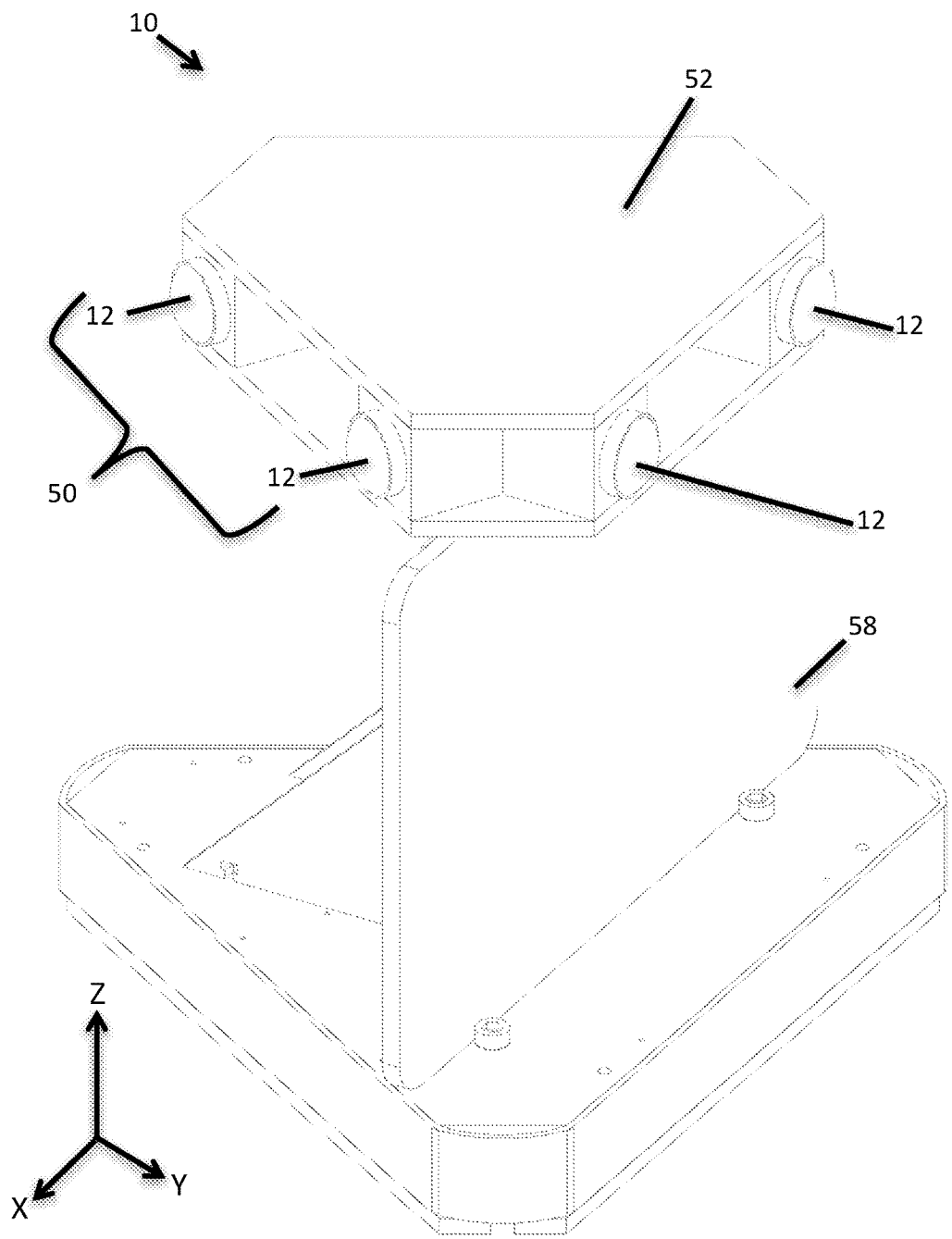
FIG. 3C is an isometric view of a third embodiment of a robot head that supports a camera system.

FIG. 3C is an isometric drawing depicting a third embodiment of robot head 10. Depicted robot head 10 has six cameras 12 including three camera pairs 50. Each camera pair 50 is separated laterally (along X and Y) along a side of a polygonal portion 52 of robot head 10. Thus there are three sides of portion 52 of robot head 10 that each support a camera pair 50. Relative to the designs depicted in FIGS. 3A and 3B this robot head 10 can capture 360 degree image information in higher resolution. Also, the lateral separation between the cameras 12 of each camera pair 50 provides the three-dimensional stereoscopic image information to be captured.

Figure 3D:
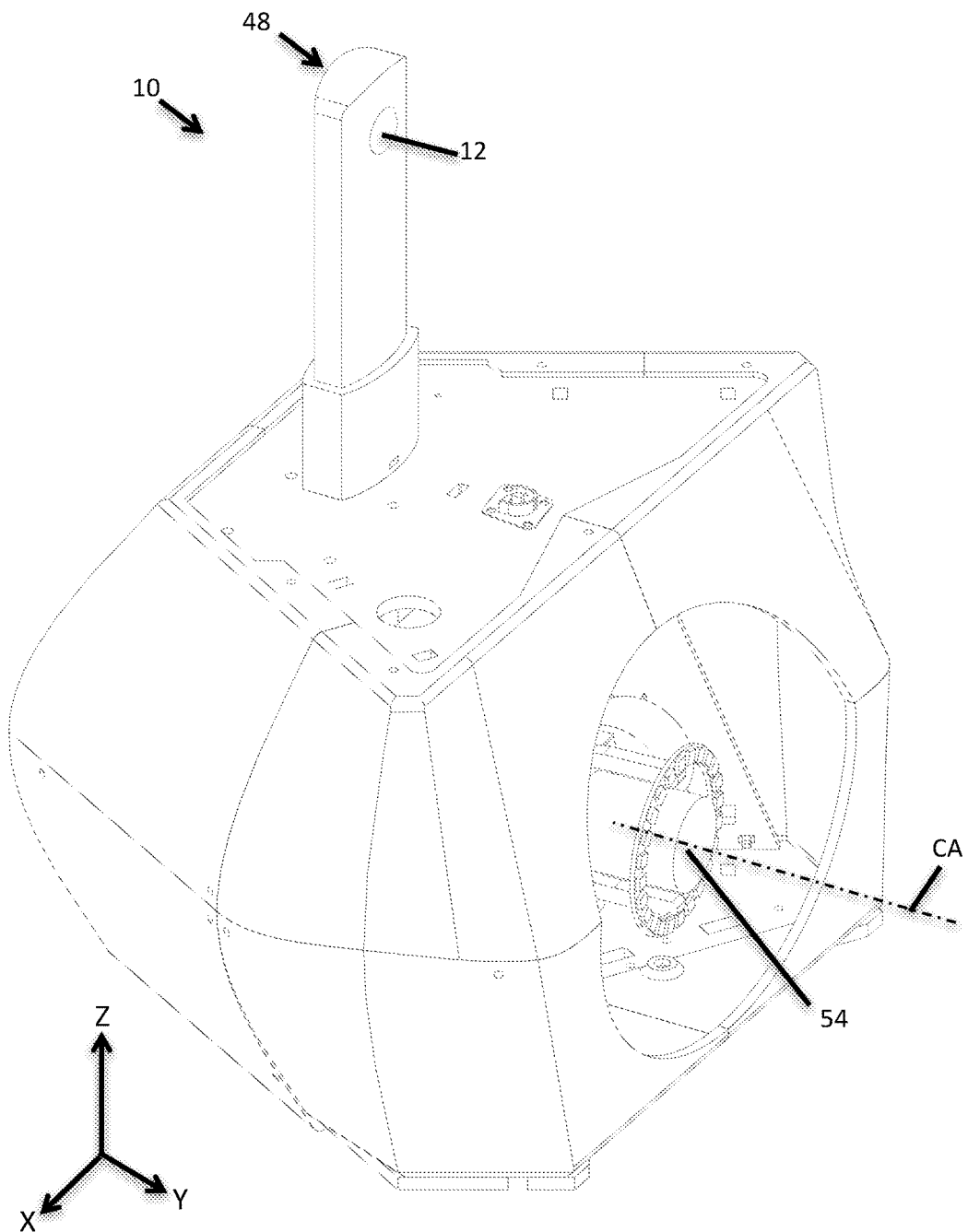
FIG. 3D is an isometric view of a fourth embodiment of a robot head that supports a camera system.

FIG. 3D is an isometric drawing of a fourth embodiment of robot head 10. This robot head includes a camera pair 48 that is similar to one of the camera pairs 48 depicted with respect to FIG. 3A. In addition, this robot head 10 includes an SLR camera 54 for capturing very high quality two-dimensional images. This embodiment can include a mechanism (internal as part of robot head 10) that enables camera 54 to be controllably rotated about axes X (pitch), Y (roll), and Z (pan). In the figures that follow FIG. 3D, it is to be understood that element 12 is generic for any camera 12 including an SLR camera 54.

Yet other embodiments of robot head 10 are possible. For example, the SLR camera 54 of FIG. 3D could be combined with any of the cameras depicted with respect to FIG. 3A, FIG. 3B, or FIG. 3C. Also, more than one SLR camera 54 or mirrorless camera might be utilized in some embodiments of robot head 10 to provide high quality 3D image data.

Any exemplary embodiment of robot head 10 can include user interface features 14 (FIG. 1) such as a flat panel touch display 58 as depicted in various figures including FIGS. 2A, 2B, and 3A-C. Touch display 58 enables user inputs and displays information or graphics. In some embodiments touch display 58 can display previews of captured images and videos for a user.

Figure 4:
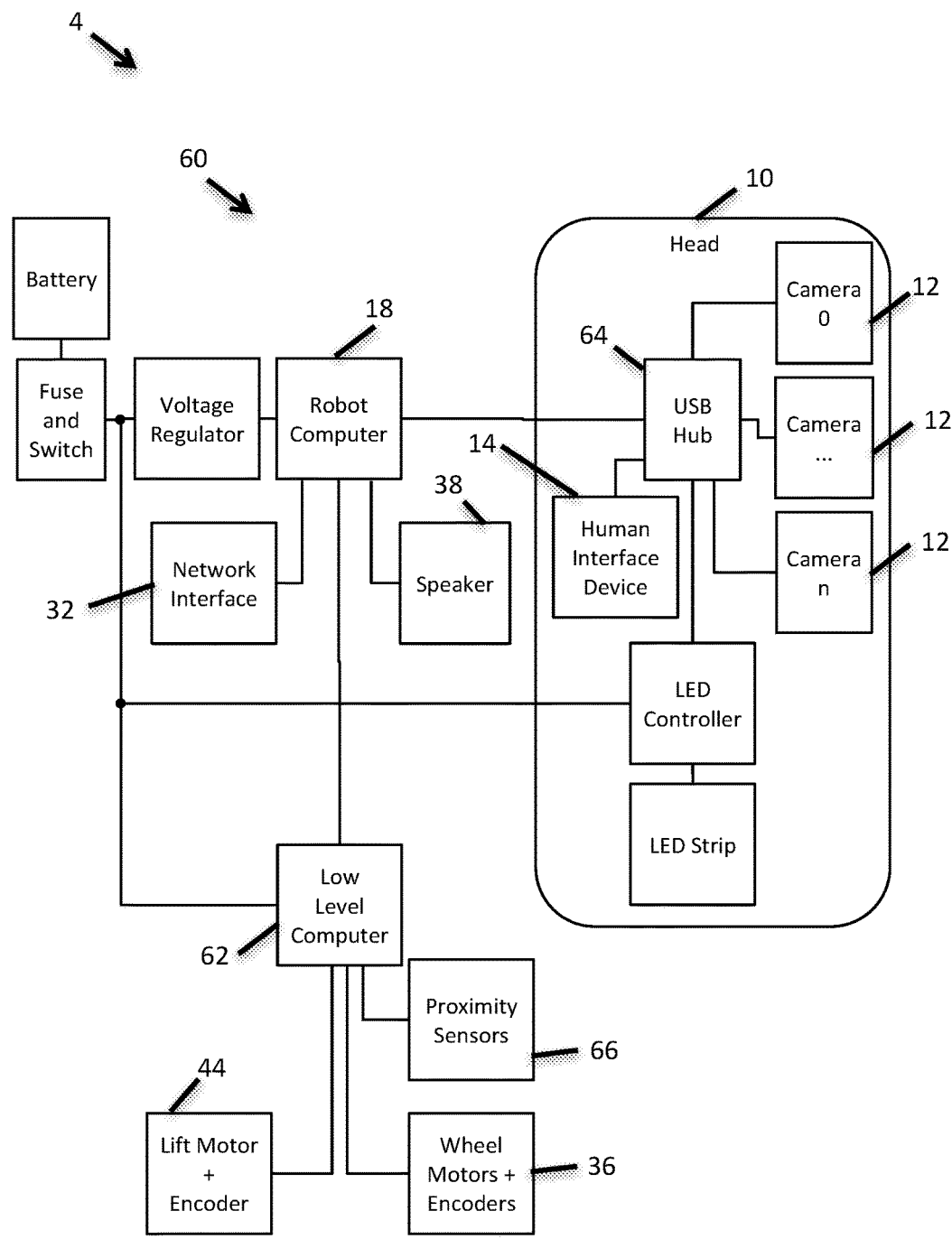
FIG. 4 is a simplified electrical block diagram of an exemplary embodiment of a camera robot for capturing image frames.

FIG. 4 is a simplified electrical block diagram for an exemplary robot 10. Where applicable, element numbers in the electrical block diagram of FIG. 4 will correspond to element numbers in prior diagrams. As an example, the electrical block representing head 10 in FIG. 4 corresponds to the physical head 10 illustrated in FIGS. 2A-C and 3A-D.

Robot 10 has a control system 60 that is disclosed as an exemplary system of a high level robot computer, a low level computer, controllers, interface devices, and other devices that control the components of camera robot 10 to provide transport along support surface S, rotation along various axes, and internal control of individual components. Control system 60 includes but is not necessarily limited to robot computer 18, low level computer 62, and USB hub 64.

Robot computer 18 is coupled to (wireless) network interface 32. Network interface 32 allows the robot computer 18 to communicate either directly with client devices (such user mobile device 20) or indirectly through a cloud network 6 (see FIGS. 1A and 1B). Robot computer 18 is also coupled to low level computer 62 through which it can control lateral motion along support surface S, a vertical height adjustment of robot head 10, and track proximity to surrounding objects. Low level computer 62 is coupled to omni-directional wheel motors and encoders 36 for controlling and tracking motion of robot 4 along support surface S. Low level computer 62 is coupled to vertical positioning mechanism lift motor and encoder 44 for controlling and tracking the height h of robot head 10 above base 8 (and therefore the height H of the camera axis above support surface S). Low level computer 62 receives inputs from proximity sensors 66 to track the proximity of robot 4 to surrounding objects.

Through the USB hub 64 the robot computer 18 is coupled to cameras 12, human interface 14, and other head-mounted features. Robot computer 18 can thereby control camera functions (of camera 12) and receive images from the cameras 12. Cameras 12 may also include a microphone and audio signals may be sent to robot computer 18. Robot computer 18 can also communicate with a user with the human interface device 14 which can include a touch display 58. Robot computer 18 may also communicate to a user via speakers 38.

In an alternative embodiment the camera 12 is wirelessly coupled to robot computer 18. In another alternative embodiment the (wireless) network interface 32 can be directly coupled to USB hub 64. As can be seen, various embodiments are possible for coupling components and routing information.

The camera 12, robot computer 18, and possibly other devices collectively define an image processing system. The image processing system includes hardware and software for processing an image received by camera 12. As such, it can reside individually in camera 12, individually in robot computer 18, individually in mobile device 20, individually in some other device (not shown), or collectively in more than one of devices 12, 18, and 20. The image processing system can analyze images that are received by camera 12 to recognize eyes, faces, and/or other features of subjects (human and/or animal) to be photographed. The image processing system can also recognize and process machine-readable codes and images of a user or a camera robot 4. The image processing system can also analyze orientation, location, and/or motion of various features or images received by camera 12.

Figure 5:
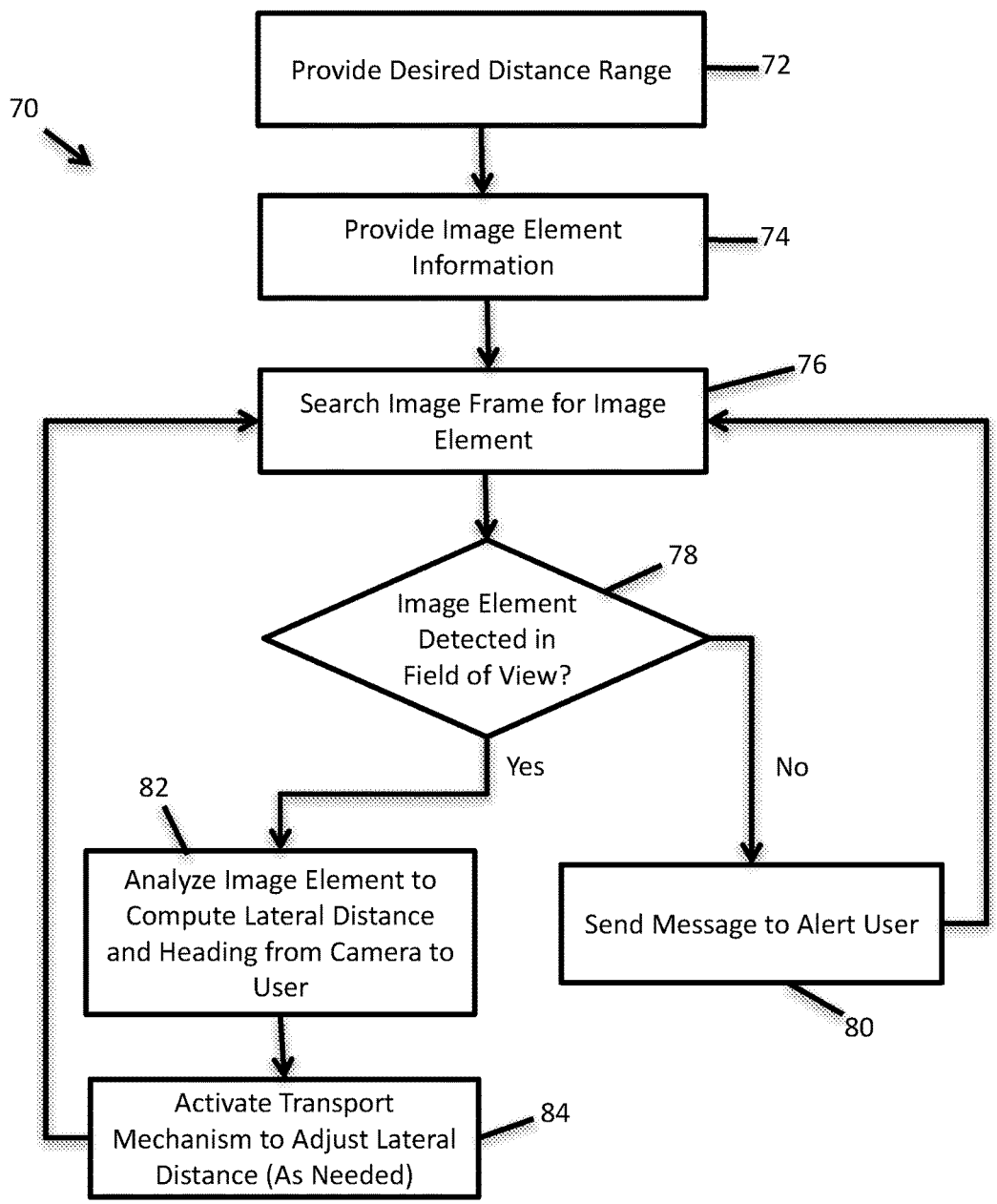
FIG. 5 is a flowchart representation of an exemplary method whereby a camera robot can maintain a defined distance from a user who is walking through a venue.

FIG. 5 is a flow chart depicting an exemplary method 70 by which a user can utilize a camera robot 4. Method 70 can be referred to as a "digital leash" method whereby an image processing system of camera robot 4 maintains a specified distance from a user as that user walks from one location to another.

According to step 72 a required distance range is provided to robot computer 18 that specifies a distance range between the user and camera robot 4. According to step 74, image element information is provided to robot computer 18. The image element is any object that the camera robot 4 will track to identify the user and to compute a distance between the user and the camera robot 4. In one embodiment the image element can be a machine-readable code carried by the user. In another embodiment the image element can be an image (partial or complete) of the user.

According to step 76 the image processing system searches an image frame captured by camera 12 for the image element which leads to decision step 78. If the image element is not found then the robot computer 18 sends an alert to the user's mobile device 20 that indicates that the camera robot 4 has "lost" the user according to step 80. The user can then walk back toward the camera robot 4 and the camera robot 4 can continue searching for the image element.

If the image element is detected then the image processing system analyzes the image element to compute or estimate a lateral distance and heading from the camera robot 4 to the user according to step 82. As part of step 82, the robot computer compares the computed lateral distance to the desired distance range (from step 72). Based upon the comparison the robot computer activates the transport mechanism 34 to move the robot laterally along the support surface S so that the computed lateral distance will be closer to the midpoint of the desired distance range. After step 84 the process loops back to step 76.

In one embodiment, step 74 includes a photo session which includes the following steps: (1) The user initiates a photo session with the robot camera 4. (2) The robot camera captures an image of the user. In some embodiments, the robot camera 4 instructs the user to stand at different orientations relative to the camera robot 4 which results in different images having different orientations of the user. During step 76, the camera robot 4 then searches for the different orientations. This allows the camera robot 4 to find the user even if the user's back is oriented toward the camera robot 4.

Figure 6A:
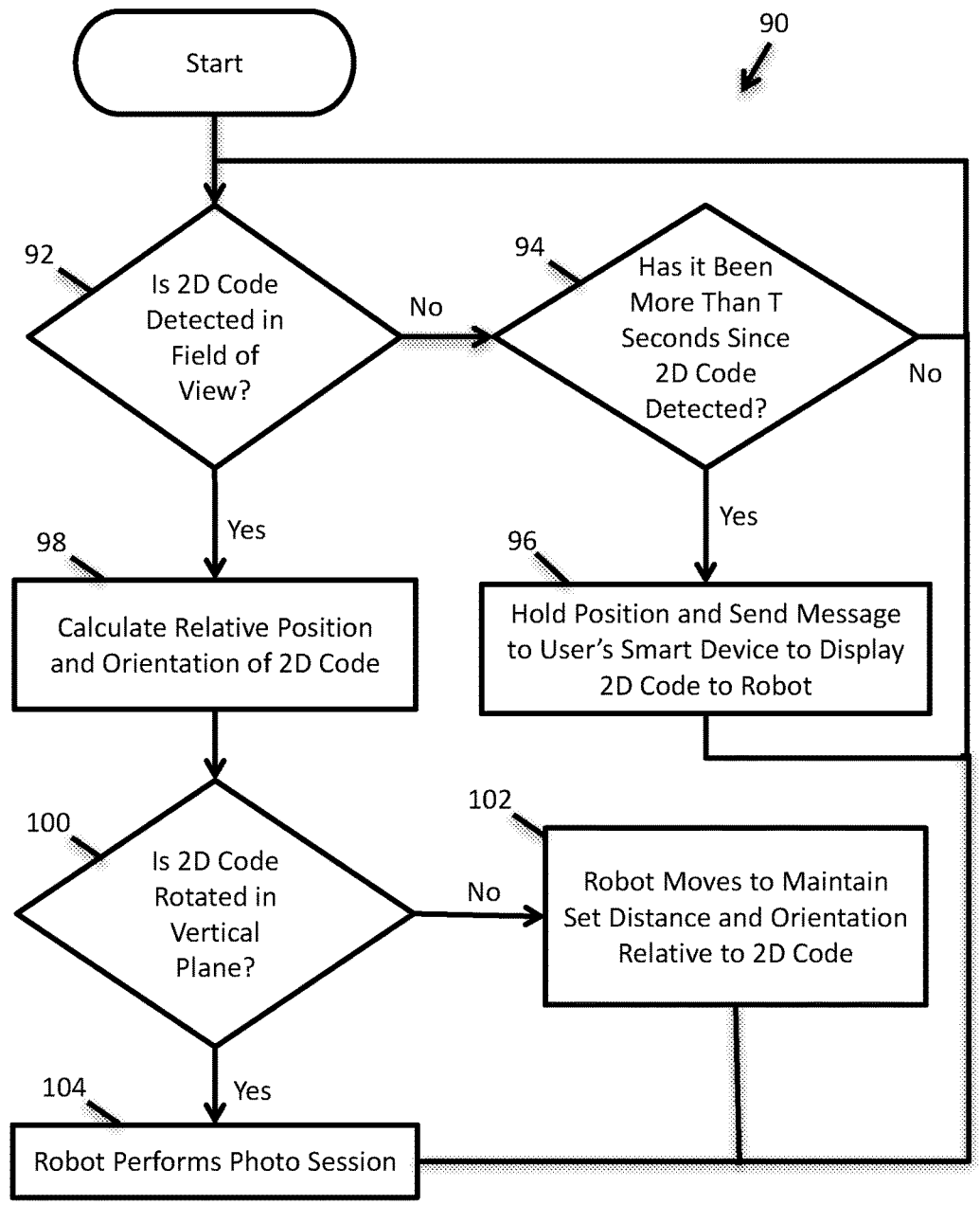
FIG. 6A is a flowchart representation of a first exemplary method whereby a camera robot can maintain a defined distance from a user and the user can execute a photo session.

FIG. 6A is simplified flowchart depicting an embodiment of a method 90 by which a user can use a camera robot 4 at a venue in which the user is walking around and desiring to have photos and videos captured. With this method the user visibly carries an object with a two-dimensional machine-readable code (2D code element) thereon. This two-dimensional machine-readable code can be a two-dimensional barcode, a QR code, a variable icon, a variable symbol, or another two-dimensional image that can be read by machine. In one embodiment the 2D code element is generated by a display on the user's mobile device 20.

According to step 92 the image processing system (camera 12 and robot computer 18) scans an image frame to search for the 2D code element. If the 2D code element is not found then the camera robot 4 determines whether it has been more than a predetermined time T since the 2D code element was last detected according to step 94. If not then the process loops back to step 92. If the step 94 is true (yes) then the camera robot 4 holds its position and sends a message to the user's mobile device 20 that tells the user to display the 2D code to the robot according to step 96. Then the process loops back to step 92.

If according to step 92 the 2D code element is detected then the image processing system calculates the relative position and orientation of the 2D code element according to step 98. Robot computer 18 stores information that defines two different orientation ranges. A first orientation range is defined as "approximately horizontal." A second orientation range is defined as "approximately vertical." According to step 100 a determination is made as to which orientation range the 2D code element is within. If the 2D code element is approximately horizontal then the process proceeds to step 102. According to step 102 the robot computer activates the transport mechanism 34 to move the camera robot 4 to within a specified distance frame from the 2D code element.

According to step 100—if the 2D code element is approximately vertical then the process proceeds to step 104. According to step 104 the camera robot 4 performs a photo session. According to step 104 the image processing system activates the transport mechanism 34 and the vertical positioning mechanism 16 to properly frame the user in an image frame of camera 12. This includes utilizing the vertical positioning mechanism to move the camera axis CA to as close to the user's eye level as possible. The image processing system focuses camera 12 on the user and then captures one or more image frames and possibly audio.

In some embodiments step 104 includes properly aligning the camera 12 image frame upon a group of photo subjects including the user. The vertical positioning mechanism can move the camera axis CA to a height that is within a range of eye levels of the photo subjects.

In other embodiments step 104 may also include step 102 such that the camera robot 4 maintains a specified distance from the 2D code element during the photo session. For example, a user may desire to have image frames (video) recorded of themselves or subjects associated with the user while walking through a venue.

Figure 6B:
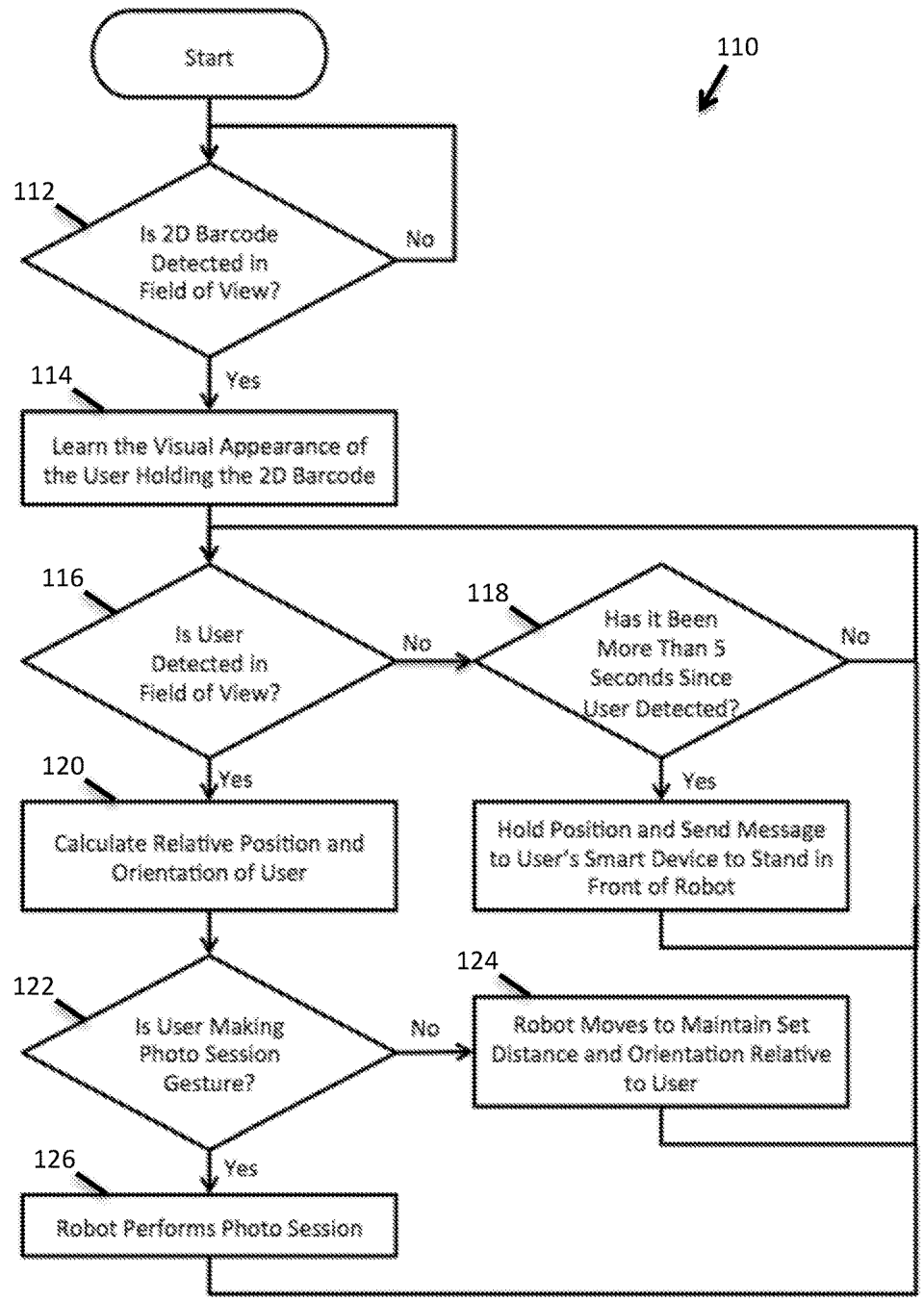
FIG. 6B is a flowchart representation of a second exemplary method whereby a camera robot can maintain a defined distance from a user and the user can execute a photo session.

FIG. 6B is a flowchart of a method 110 that is similar to that of FIG. 6A except that the image processing system utilizes a user image. According to step 112 the image processing system (camera 12 and robot computer 18) search an image frame for a 2D barcode element held by a user. This process repeats until the 2D barcode element is detected. Once it is detected the process proceeds to step 114.

According to step 114, the image processing system "learns" an image of the user. Step 114 is carried out by capturing an image of the user and then characterizing certain attributes. This can include analyzing colors or patterns of the user's clothing or geometric aspects of the user.

According to step 116, the image processing system scans an image frame. The image is processed to determine if the user is detected. If the user is not detected then the process proceeds to step 118.

According to step 118 the robot computer 18 determines whether more than a specified time period T has passed since the user has been detected. If not, then step 116 is repeated. However, if the time T has passed then the process proceeds to step 120. According to step 120 the robot computer 18 sends a message to the user's mobile device 20 that tells the user to stand in front of the robot computer 18. Then the process loops back to step 116.

If according to step 116 the user is detected then the process proceeds to step 120. According to step 120 the image processing system determines a position and orientation of the user. This can include estimating a distance between the user and the robot 4.

According to step 122 the image processing system determines whether the user is "making a gesture." This can take on more than one form. One example might include the user displaying the 2D code element in a particular orientation. Another example might be the user waving her hands back and forth. If the user does not detect a gesture then the process proceeds to step 124.

According to step 124 the robot computer 18 activates transport mechanism 34 to move the robot to within a specified distance of the user. This may include changing a camera axis CA orientation or height relative to the user. Then the process loops back to step 116.

If according to step 122 the image processing system detects a user gesture, then the process proceeds to step 126. According to step 126 the robot system performs a photo session. This step is similar or the same as step 104 of FIG. 6A.

Figure 7:
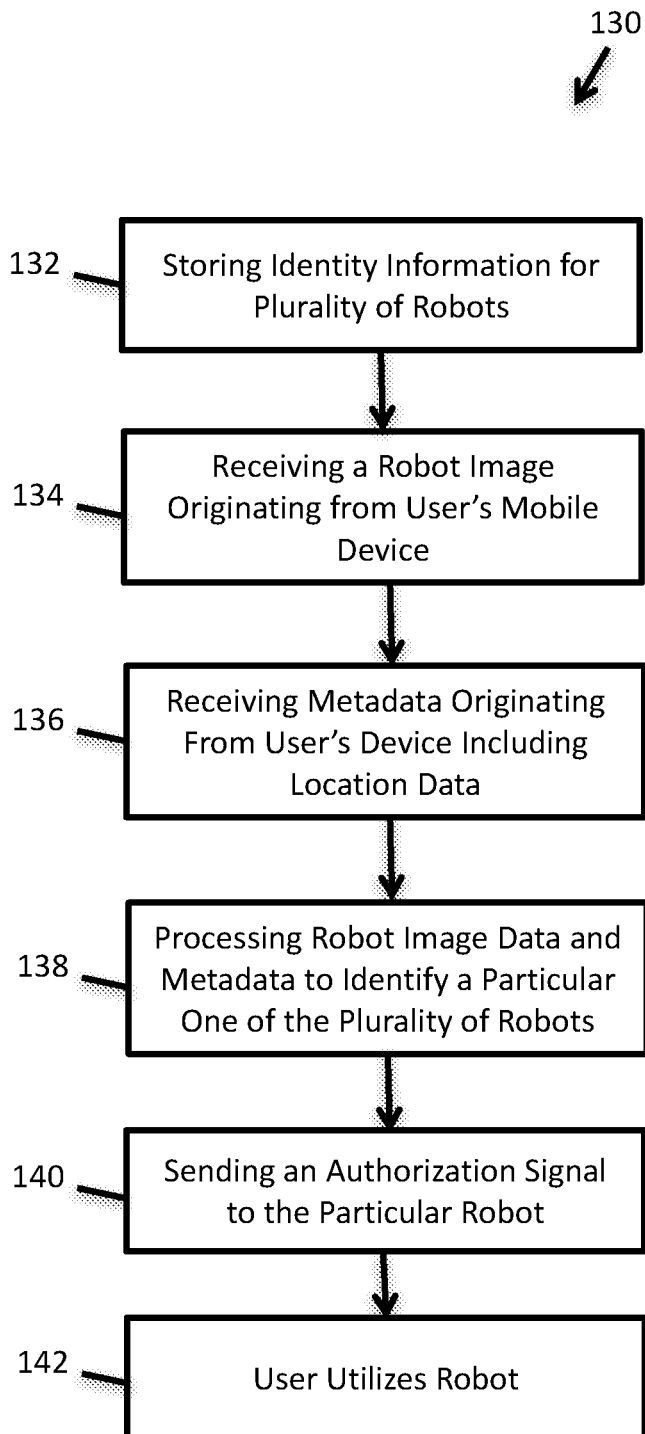
FIG. 7 is a flowchart representation of an exemplary method whereby a user gains an authorization to utilize a camera robot.

FIG. 7 is a flowchart depicting a first exemplary method 130 whereby a user is able to initiate a photo session with a camera robot 4. According to the method 130, there is a system whereby a plurality of camera robots 4 are under the control of a robot cloud server 22 (FIG. 1B).

According to 132, the cloud server 22 stores identity information for a plurality of camera robots 4. The camera robots 4 can be distributed geographically and can be large in number.

According to step 134, the cloud server 22 receives an image of a camera robot 4 originating from a user's mobile device 20. According to step 136 the cloud server 22 receives metadata originating from the user's mobile device 20 that includes location data and may include other metadata that is indicative of a particular camera robot 4.

According to step 138 the cloud server 22 processes the camera robot image and metadata from steps 134 and 136 to uniquely identify the camera robot 4 that the user desires to use. According to step 140, the cloud server 22 sends an authorization signal to the particular camera robot 4 so that the user can utilize the camera robot 4 according to step 142. In the process of utilizing the camera robot 4 the user may perform any of methods 70, 90, or 110 depicted in FIGS. 5, 6A, and 6B respectively.

Figure 8:
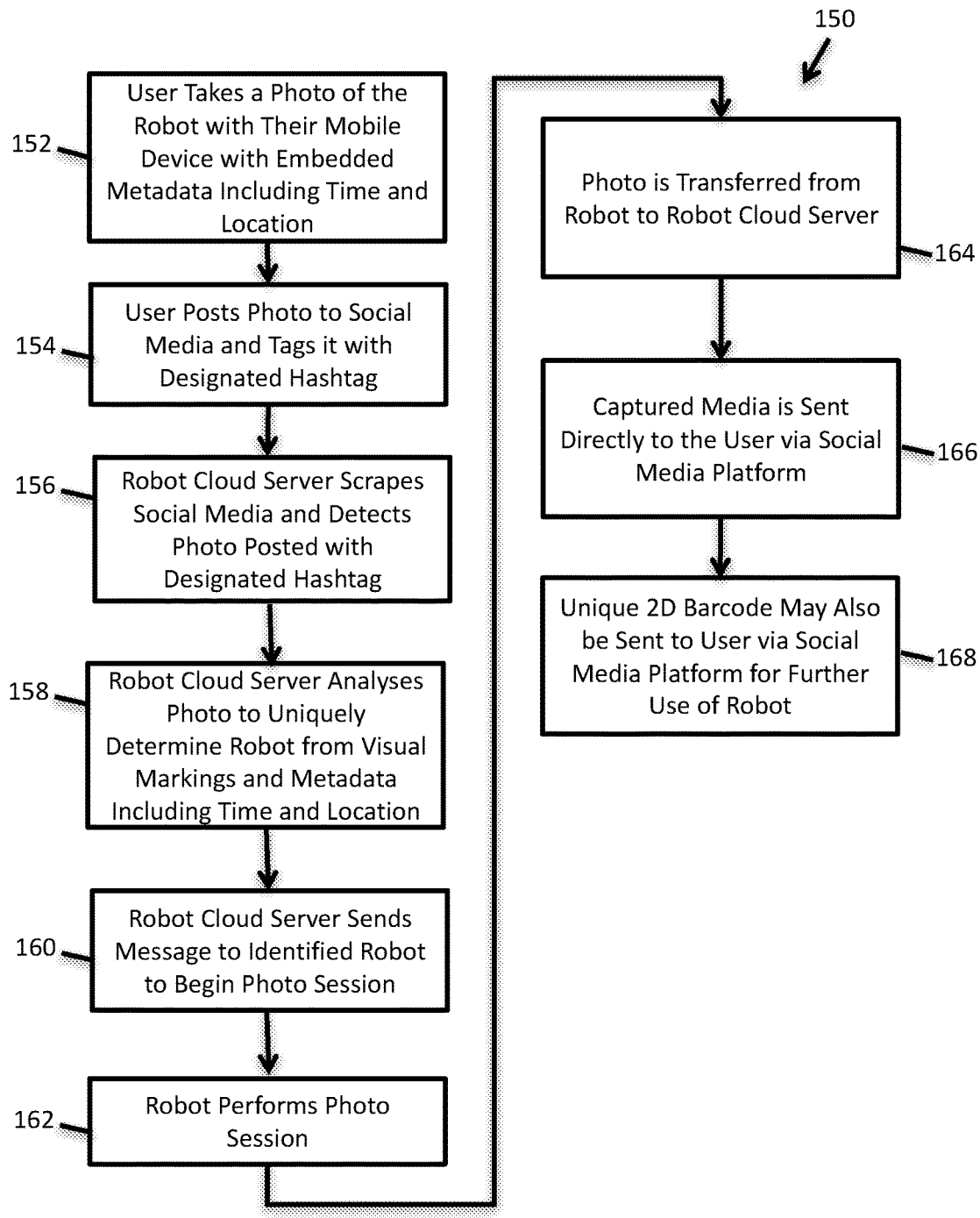
FIG. 8 is a flowchart representation of an exemplary method by which a user utilizes a social media website to start a photo session with and/or utilize a camera robot.

FIG. 8 is a flowchart depicting a second exemplary method 150 by which a user can initiate a photo session with a camera robot 4. According to this method a robot cloud server 22 is in communication with a plurality of camera robots 4 (see FIG. 1B). The cloud server stores information that uniquely identifies each of the camera robots 4. The cloud server 22 also stores a "designated hashtag" that is indicative of the robotic camera system.

According to step 152 a user captures an image of a camera robot 4 using the user's mobile device 20. The image capture includes embedded metadata including a timestamp and location data.

According to step 154 the user posts the photo of the camera robot 4 with the embedded metadata to a social media website hosted by a third-party cloud server 24 along with the designated hashtag. According to step 156 the robot cloud server 22 scrapes the social media website for the designated hashtag. Scraping is essentially a method of "web harvesting" or web data extraction. Upon detecting the hashtag, the robot cloud server 22 then identifies the image from the user's mobile device 20.

According to step 158 the robot cloud server 22 analyzes the image and associated metadata to uniquely identify the camera robot 4. The image may contain markings on the robot (such as a 2D barcode, QR code, or other features). Also, the location and time metadata may be associated with certain camera robot identifications in a database of the robot cloud server 4.

According to step 160, the robot cloud server sends an authorization command to the identified camera robot to begin a photo session with the user. In response, the robot begins a photo session with the user according to step 162. The photo session may be similar to that described with respect to element 104 of FIG. 6A. During the photo session the camera robot 4 captures images of the user and/or other subjects associated with the user.

According to step 164, the camera robot 4 transfers the captured image frames to the robot cloud server 22. According to step 166 the robot cloud server 22 transfers the captured image frames to the third-party server 24 of the social media website, whereby the user then has access to the captured images.

In an optional step 168, the robot cloud server sends the user a unique 2D machine-readable code element. The user can then use this 2D code element to utilize the camera robot 4 according to any or all of method 70 (FIG. 5), method 90 (FIG. 6A), and method 110 (FIG. 6B). This includes utilizing a "digital leash" to have the camera robot 4 follow the user and perform more photo sessions.

In other embodiments the robotic camera system 2 verifies that the photo session is taking place with the user who posted the photo of the camera robot 4. In a first of these embodiments, the cloud server 22 stores an "expiration time differential." As stated earlier, the posted photo includes timestamp data for the time of image capture of camera robot 4. As part of step 158, the cloud server 22 computes a time differential between the time of step 158 from the timestamp from the photo metadata. If the time differential exceeds the expiration time differential then the process halts and does not proceed to step 160. Otherwise the process proceeds to step 160.

In another embodiment the user includes some self-identifying information as part of step 154. This may include an image of the user or an article that the user is carrying. As part of step 158 the cloud server 22 compares the self-identifying information with an image of the user. If the comparison indicates a match, the process proceeds to step 160. Otherwise the process halts.

In yet another embodiment the camera robot 4 displays continuously changing identification codes on touch display 58 that each have an expiration time. One such displayed code at a capture time is captured by the user's mobile device 20 as part of step 152. According to step 158 the cloud server 22 uses the code to identify the camera robot 4. If the expiration threshold for the code has not yet been reached, then the process proceeds to step 160. Otherwise the process halts.

In a further embodiment the robotic camera system 2 verifies that the user has an account with the social media website that corresponds to the posted photo and metadata. This can be done by having the robot capture an image of the user or other data at the beginning of the photo session to compare that image or other data with data received from the social media website.

Figure 9:
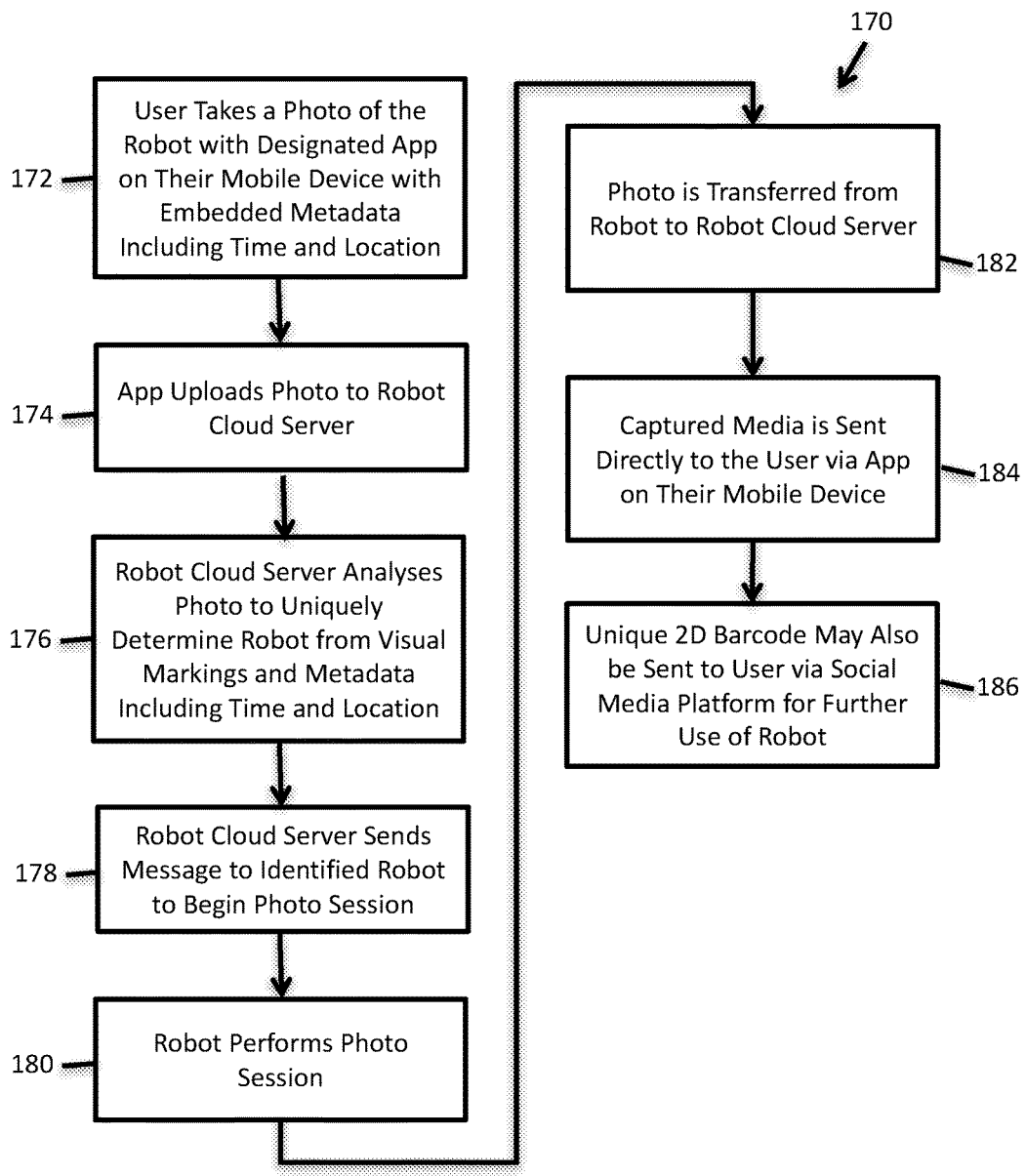
FIG. 9 is a flowchart representation of an exemplary method by which a user utilizes a designated application on a mobile device to start a photo session with and/or utilize a camera robot.

FIG. 9 is a flowchart depicting a third exemplary method 170 by which a user can initiate a photo session with a camera robot 4. According to this method a robot cloud server 22 is in communication with a plurality of camera robots 4 (see FIG. 1B). The cloud server stores information that uniquely identifies each of the camera robots 4. Also according to this method the user has a mobile device 20 with an application for communicating with the robot cloud server 22.

According to step 172 the user captures an image of a camera robot 4 with the application which is stored on the user's mobile device 20. The stored image also includes embedded metadata including a timestamp and location for the image capture.

According to step 174 the user utilizes the mobile device to transfer the captured image to the robot cloud server 22. According to step 176 the robot cloud server analyzes the captured image and metadata to uniquely identify the camera robot 4.

According to step 178 the robot cloud server 22 sends an authorization command to the camera robot 4 to begin a photo session with the user. In response, the robot begins a photo session with the user according to step 180. The photo session may be similar to that described with respect to element 104 of FIG. 6A. During the photo session the camera robot 4 captures images of the user and/or other subjects associated with the user.

According to step 182, the camera robot 4 transfers captured images from the photo session to the robot cloud server 22. According to step 184 the robot cloud server 22 then transfers the images to the user's mobile device 20 via the application. Alternatively, the camera robot 4 could transfer the captured images directly to the user's mobile device 20 via the application.

In an optional step 186, the robot cloud server sends the user a unique 2D machine-readable code element. The user can then use this 2D code element to utilize the camera robot 4 according to any or all of method 70 (FIG. 5), method 90 (FIG. 6A), and method 110 (FIG. 6B). This includes utilizing a "digital leash" to have the camera robot 4 follow the user and perform more photo sessions.

The specific embodiments and applications thereof described above are for illustrative purposes only and do not preclude modifications and variations encompassed by the scope of the following claims.

What we claim is:

1. A camera robot for capturing image frames during a photo session in response to a request initiated by a user comprising:
    a base having a transport mechanism that controllably imparts motion and positions the robot along a support surface;
    a robot head;
    a camera mounted to the robot head; and
    a control system including a processor and a non-transient medium storing computer-readable instructions that when executed by the processor perform a method including:
        storing an image element physically carried with the user that is one or more of an article of clothing, a visual attribute of the user, an icon carried by the user, or a machine-readable code carried by the user;
        storing a desired distance range;
        searching an image frame for the image element;
        if the image element is found, measuring and estimating a distance and heading between the camera and the image element; and
        activating the transport mechanism to move the robot laterally until the camera is positioned within the desired distance range from the image element.
2. The camera robot of claim 1 wherein the method further comprises:
    if the image element is not found then transmitting a message to a mobile device held by the user.
3. The camera robot of claim 1 wherein the method further comprises:
    determining an orientation of the image element; and
    if the orientation is within a predetermined range then initiating a photo session during which the camera captures image frames of a subject.
4. The camera robot of claim 1 wherein the camera robot includes a vertical positioning mechanism that couples the robot head to the base and the method includes operating the vertical positioning mechanism to vertically adjust a height of the robot camera relative to the user.
5. The camera robot of claim 4 wherein the method includes positioning a camera axis relative to eye level of one or more subjects.
6. The camera robot of claim 1 wherein the method includes rotating the camera with respect to the robot head about at least one axis to improve image frames of the user.
7. The camera robot of claim 1 wherein the method includes capturing an image of the user and then storing all or a portion of the image as the image element.
8. The camera robot of claim 7 wherein the image element is an image of the user's face.
9. The camera robot of claim 7 wherein the method includes instructing the user to assume different orientations relative to the camera robot whereby the camera robot can identify the user at different orientations.
10. A method of capturing images of one or more users who are walking through a venue comprising:
    providing a robot camera which includes:
        a base having a transport mechanism that controllably imparts motion and positions the robot along a support surface;
        a robot head;
        a camera mounted to the robot head; and
        a control system; and
    storing an image element associated with the user;
    storing a desired relative geometric parameter that quantifies a required geometric configuration range of the user with respect to the robot;
    searching a frame for the image element;
    if the image element is found, then computing a geometric configuration of the user with respect to the robot camera; and
    activating one or more robot mechanisms to adjust the geometric configuration of the user with respect to the robot camera to within the required geometric configuration range.
11. The method of claim 10, wherein adjusting the geometric configuration includes activating the transport mechanism to move the robot along the support surface.
12. The method of claim 10, wherein adjusting the geometric configuration includes activating a mechanism that adjusts a vertical height of the robot head above the support surface.
13. The method of claim 10, wherein adjusting the geometry configuration includes adjusting an angle a camera axis of the camera with respect to an axis.
14. The method of claim 10 further comprising receiving an initiation of a photo session with the user and capturing an image of the user that defines the image element.
15. The method of claim 14 further comprising providing a sequence of instructions to the user in order to complete the photo session.
16. The method of claim 15 wherein the sequence of instructions includes the user assuming different orientations about a vertical axis to enable the robot to find the image element of the user even the user is not directly facing the robot.

17. The method of claim 10 further comprising transmitting a message to a mobile device of the user if the image element is not found.

18. A camera robot for capturing image frames during a photo session in response to a request initiated by a user comprising:
- a base having a transport mechanism that controllably imparts motion and positions the robot along a support surface;
- a robot head;
- a camera mounted to the robot head;
- a vertical positioning mechanism that controllably adjusts a vertical distance between the robot head and the base; and
- a control system including a processor and a non-transient medium storing computer-readable instructions that when executed by the processor perform a method including:
  - storing an image element physically carried by the user that is one or more of an article of clothing, a visual attribute of the user, an icon carried by the user, or a machine-readable code carried by the user;
  - storing a desired range of a geometric configuration of the user with respect to the camera robot;
  - searching an image frame for the image element;
  - if the image element is found, measuring and estimating the geometric configuration of the user with respect to the camera robot; and
  - activating one or more mechanisms of the camera robot to bring the geometric configuration of the user with respect to the camera robot to within the desired range of a geometric configuration of the user with respect to the camera robot.

19. The camera robot of claim 18 wherein the geometric configuration of the user with respect to the camera robot is one or more of a lateral distance, a vertical height, and an orientation of the camera with respect to the user.

20. The camera robot of claim 18 wherein the vertical positioning mechanism is a scissor link mechanism.

* * * * *